(12) United States Patent
Barajas Gonzalez et al.

(10) Patent No.: US 10,061,702 B2
(45) Date of Patent: Aug. 28, 2018

(54) PREDICTIVE ANALYTICS FOR STORAGE TIERING AND CACHING

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/941,298

(22) Filed: Nov. 13, 2015

(65) Prior Publication Data

US 2017/0139833 A1 May 18, 2017

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
CPC .............. G06F 12/0862; G06F 2212/602
See application file for complete search history.

(56) References Cited

U.S. PATENT DOCUMENTS

| | | | | | |
|---|---|---|---|---|---|
| 5,659,743 | A | * | 8/1997 | Adams | G06F 3/0601 711/E12.07 |
| 5,896,548 | A | * | 4/1999 | Ofek | G06F 3/0607 710/20 |
| 7,827,286 | B1 | * | 11/2010 | Deflaux | G06F 17/302 711/170 |
| 8,775,741 | B1 | * | 7/2014 | de la Iglesia | G06F 12/0862 711/137 |
| 8,838,895 | B2 | | 9/2014 | Yi et al. | |
| 8,880,835 | B2 | | 11/2014 | Benhase et al. | |
| 9,032,175 | B2 | | 5/2015 | Gao et al. | |
| 2007/0239747 | A1 | | 10/2007 | Pepper | |
| 2010/0169541 | A1 | * | 7/2010 | Freikorn | G06F 12/0246 711/103 |
| 2010/0199036 | A1 | | 8/2010 | Siewart et al. | |

(Continued)

OTHER PUBLICATIONS

Kraiss et al., "Integrated document caching and prefetching in storage hierarchies based on Markov-chain predictions" pp. 141-162, The VLDB Journal vol. 7, No. 3, 1998, University of the Saarland, Saarbrucken, Germany.

*Primary Examiner* — Aracelis Ruiz
(74) *Attorney, Agent, or Firm* — Griffiths & Seaton PLLC

(57) ABSTRACT

Various embodiments for data management across a multiple-tiered storage organization by a processor. Data operations performed across the multiple-tiered storage organization are analyzed over a period of time sufficient to determine usage patterns of the data. Predictive analytics is applied to the usage patterns. Based on the predictive analytics, segments of the data are moved between the multiple-tiered storage organization according to a determined priority account for available system resources, to optimize storage characteristics of the data in the multiple-tiered storage organization.

18 Claims, 5 Drawing Sheets

(56) References Cited

U.S. PATENT DOCUMENTS

| | | | |
|---|---|---|---|
| 2011/0010514 A1* | 1/2011 | Benhase | G06F 3/061 |
| | | | 711/162 |
| 2013/0145095 A1* | 6/2013 | McKean | G06F 12/0804 |
| | | | 711/122 |
| 2014/0351505 A1* | 11/2014 | Chiu | G06F 3/061 |
| | | | 711/114 |
| 2015/0039837 A1 | 2/2015 | Quan et al. | |
| 2015/0278243 A1* | 10/2015 | Vincent | G06F 17/30174 |
| | | | 707/634 |

* cited by examiner

PREDICTIVE ANALYTICS FOR STORAGE TIERING AND CACHING

BACKGROUND OF THE INVENTION

Field of the Invention

The present invention relates in general computing systems, and more particularly to, various embodiments for applying predictive analytics to enhance storage tiering and caching operations in a computing storage environment.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE INVENTION

Various embodiments for data management across a multiple-tiered storage organization by a processor are provided. In one embodiment, by way of example only, data operations performed across the multiple-tiered storage organization are analyzed over a period of time sufficient to determine usage patterns of the data. Predictive analytics is applied to the usage patterns. Based on the predictive analytics, segments of the data are moved between the multiple-tiered storage organization according to a determined priority account for available system resources, to optimize storage characteristics of the data in the multiple-tiered storage organization.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
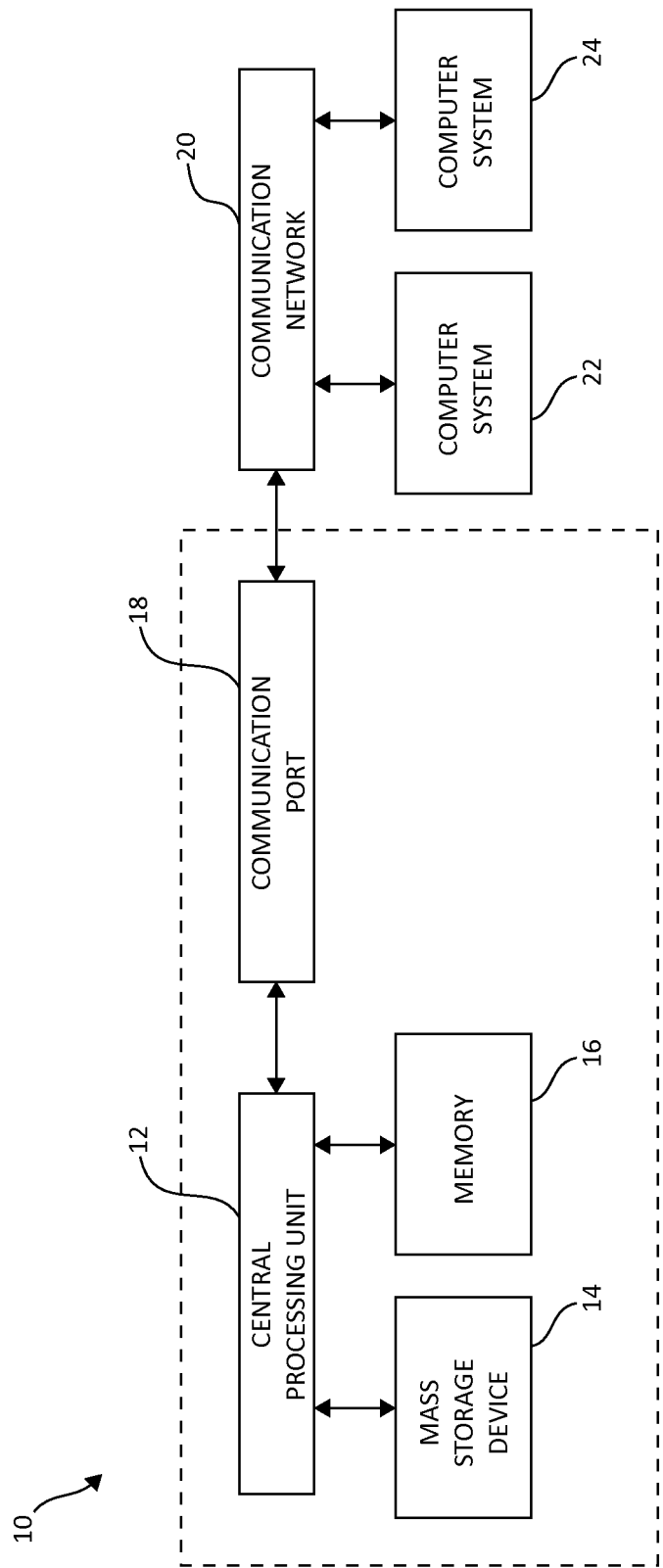
FIG. 1 is an exemplary block diagram showing a hardware structure for applying predictive analytics to storage operations in a multiple-tiered storage organization, in which aspects of the present invention may be realized.

As modern storage environments have continued to evolve, storage systems have continually increased in performance. Unfortunately, storage users are often faced with the challenge of balancing costs, capacity, and these performance enhancements. Most performance enhancements have come through improvements in how quickly the data stored on that storage device can be located and accessed.

While traditional storage has seen accompanying prices drop dramatically, storage with the ability to locate and access data in a rapid manner have considerably higher attendant costs per unit of storage. Solid state and flash technology have become important components within the "performance" storage arena, while traditional storage is still commonly viewed as simply commodity bulk storage. Balancing these types of storage environments has become the task of functions such as IBM® Easy Tier®, which, among other aspects, moves recently accessed (so called "hot") data to faster storage.

As storage environments have evolved to accept the application of tiering kinds of functionality, frequently accessed data is stored on faster, costlier storage, and data that isn't frequently accessed is stored in slower, less costly storage. Sometimes, however, not all data desired to be on fast storage will always be characterized as frequently accessed data. This is especially true for periodic access of specific data such as data that is accessed at the same time every month. Such periodically accessed data blocks may not, under some tiering regimes, qualify as "hot" data, because during the remaining time, the data is idle.

Accordingly, while storage tiering mechanisms have improved many aspects of data management in tiered storage organizations, challenges remain for data that may not fit squarely within predefined settings, or otherwise may not be addressed adequately under current storage tiering functionality according to the particular needs of a user for that particular data. A need exists for mechanisms that cover an even broader range of data efficiently for optimal storage performance in multiple-tiered storage organizations, for example.

To address this need, the mechanisms of the illustrated embodiments perform various functionality employing predictive analytics to enhance the performance of multiple-tiered storage organizations. In one embodiment, for example, these mechanisms use predictive analytics to predict read requests in the storage environment (e.g., from hosts), and either move the necessary data to faster storage or copy the data to an appropriate level of cache to allow for optimal access, and demote or evict data to lower performance storage as appropriate.

By employing predictive analytics, the mechanisms of the illustrated embodiments determine various behavioral information regarding the interpreted data, sufficient to identify data trends. Use of predictive analytics not only serves to anticipate when data may be requested, but also more efficiently utilizes all tiers of storage within the environment. Accordingly, the mechanisms of the illustrated embodiments will tier or cache data upon what the analytics suggest, inclusive of any data the mechanisms deem likely to be accessed based upon past trends.

In one embodiment, the movement and copying of data is assigned an attendant priority by the mechanisms of the illustrated embodiments. The assigned priority may take into account a number of factors, including available system resources (performance and storage). The assigned priority may change over time, as performance needs or storage resources also change in a particular storage organization.

The mechanisms of the illustrated embodiments may accomplish the functionality specified herein, such as examining data according to applied predictive analytics, by virtue of implementing idle computing resources as a background task operation(s). Using idle system resources to perform the functionality ensures, for example, that the storage performance of the multiple-tiered storage organization is not affected in a negative way when the mechanisms of the illustrated embodiments are in operation.

Upon completion of a caching or tiering operation according to various aspects of the present invention, the entity (e.g., host) accessing the data will benefit, for example, from significantly faster access to the data being requested. For purposes of the following, use of the term to "cache" is intended to refer the placement of a copy of data into memory or higher performance storage, while the term to "tier" is a movement of data to higher (or lower) performance storage. Caching operations may either be read only or read/write with an accompanying invalidation of the related subordinate storage data.

The mechanisms of the illustrated embodiments may examine a wide variety of statistical information pertaining to the data residing in the multiple-tiered storage hierarchy (incorporating cache) in the application of predictive analytics. Examples of the statistical analysis will be presented in the following. Exemplary operations performed according to various aspects of the present invention include (1) a read pattern detection operation, (2) data movement/copy operation, (3) a block move and count operation, (4) a data storage read/write throughput measurement operation, (5) a data storage read/write IOPS (input/output operations per second) measurement, (6) a data storage consumption measurement, (7) disk thrashing detection (e.g., how many input/output operations are being performed in moving data versus the actual read requests), and (8) predictive background data transfers, among other functionality.

To perform read pattern detection functionality, in one embodiment, a repository (e.g., table) is configured to hold entries produced for all read request operations in the storage organization. The entries may include, for example, the starting and ending logical block address (LBA) of the read request, the storage performance identifier of where the data is located, and a time stamp of when the request was made. Partial match read request patterns may be determined based upon their inclusion within the starting and ending LBA of the read request.

The entry repository may then prioritize larger reads based upon the previously stored values becoming partial match records under the new larger read within the window of read request tracking. Another aspect of the table, in another embodiment, may be to track read operations over time. This read operation tracking may include, but is not limited to such times as a time of day, day of week, day of month, and month.

In one embodiment, configuration, setup, and operation of read pattern functionality facilitates the predictive data caching and tiering functionality that follows, subsequently. In an alternative embodiment, the read pattern detection repository may be pruned to facilitate memory and storage constraints, for example.

Pursuant to implementing various data movement/data copying functionality, the mechanisms of the illustrated embodiments perform various data analytics operations to analyze, for example, the information in the read pattern detection repository so that the mechanisms can determine the most effective data caching and tiering method for the storage environment. This is done, for example, by copying or moving data to either faster or slower tiers within the storage environment.

In one embodiment, thresholds for determining when data will be copied or moved will be based on a combination of prospective performance needs and potential performance improvements used in conjunction with the information in a Block Caching and Tiering Count table and is used to ensure that transfers, or additional transfers, of the data is warranted.

In one embodiment, a block move and count mechanism is implemented according to various aspects of the present invention. To ensure that the data movement functionality previously mentioned is effective, the original storage performance identifier, original LBA range, and new location when the data is copied or moved is stored within a block move and count table. This information is used, for example, with the data movement functionality to reduce unnecessary data caching or tiering operations.

The mechanisms of the illustrated embodiments, pursuant to implementing predictive analytics functionality, also implement various tracking operations. Tracking both read and write throughput within the multiple-tiered storage organization serves to provide important information usable by the data movement mechanisms performing various caching and tiering operations to determine an optimal placement of the data to facilitate appropriate performance. Furthermore, tracking both read and write input/output operations per second (IOPS) also serves to provide important, usable information by the data movement mechanisms.

In addition to the tracking operations mentioned previously, implementing data storage consumption functionality to track utilization of all available storage capabilities, is useful in the further implementation of predictive analytics, for example, in order to ensure optimal placement for the data within the multiple-tiered storage organization without unduly depleting various storage resources.

As previously mentioned, the mechanisms of the illustrated embodiments may implement disk thrashing detection functionality. By tracking a combination of read and write throughput as well as latency within the storage environment, the disk thrashing detection functionality may be used to keep the data movement functionality from adversely impacting performance within the storage environment. In addition, in one embodiment, the disk thrashing detection functionality may be configured to enforceuser configurable thresholds to define desired performance settings which the data movement functionality may utilize. This process permits configurable windows for when the data movement functionality operates, in cases where background tiering or caching should only run during pre-defined periods of time or on a routine schedule.

Also, and again as previously mentioned, the various aspects of the present invention, including monitoring, tracking, pattern recognition and data analytics functionality, may be adapted to be performed using idle resources as a background process(es). Using the predictive analytics functionality, analytics may be applied to collected data to determine trends and usage periods so that models may be produced that accurately predict storage access patterns on a long term basis. These trends may take into account historical instances where storage resources were utilized. Recommendations based upon these models may then be used to intelligently manage resource allocation within the storage. In one embodiment, based upon leveraging the cost of storage performance versus the service requirements, a determination may be made as to whether or when to tier or cache the predicted segments of data.

Additionally, in other, alternative embodiments, user defined priorities can be leveraged to preserve performance capacity based on business need or other factors. These external factors may be incorporated into the overall predictive analytics function, and may, in some cases, reduce overall performance. Yet the external factors may be required by certain business necessities, regulations, or other reasons. The mechanisms of the illustrated embodiments then may balance the enhancement overall performance of the storage organization with the external factors (e.g., ensure that certain necessities or requirements continue to be satisfied), for example.

Turning now to the Figures, and first to FIG. 1, exemplary architecture 10 of a computing system environment is depicted. Architecture 10 may, in one embodiment, be implemented at least as part of a system for effecting mechanisms of the present invention. The computer system 10 includes at least one central processing unit (CPU) 12, which is connected to communication port 18 and memory device 16. The communication port 18 is in communication with a communication network 20. The communication network 20 may be configured to be in communication with systems 22, 24 and architecture 10, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere, and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. As one of ordinary skill in the art will appreciate, a number of systems 10 may be configured in a connected and/or distributed way, physically located together or across a long geographically connected network, for example.

Figure 2:
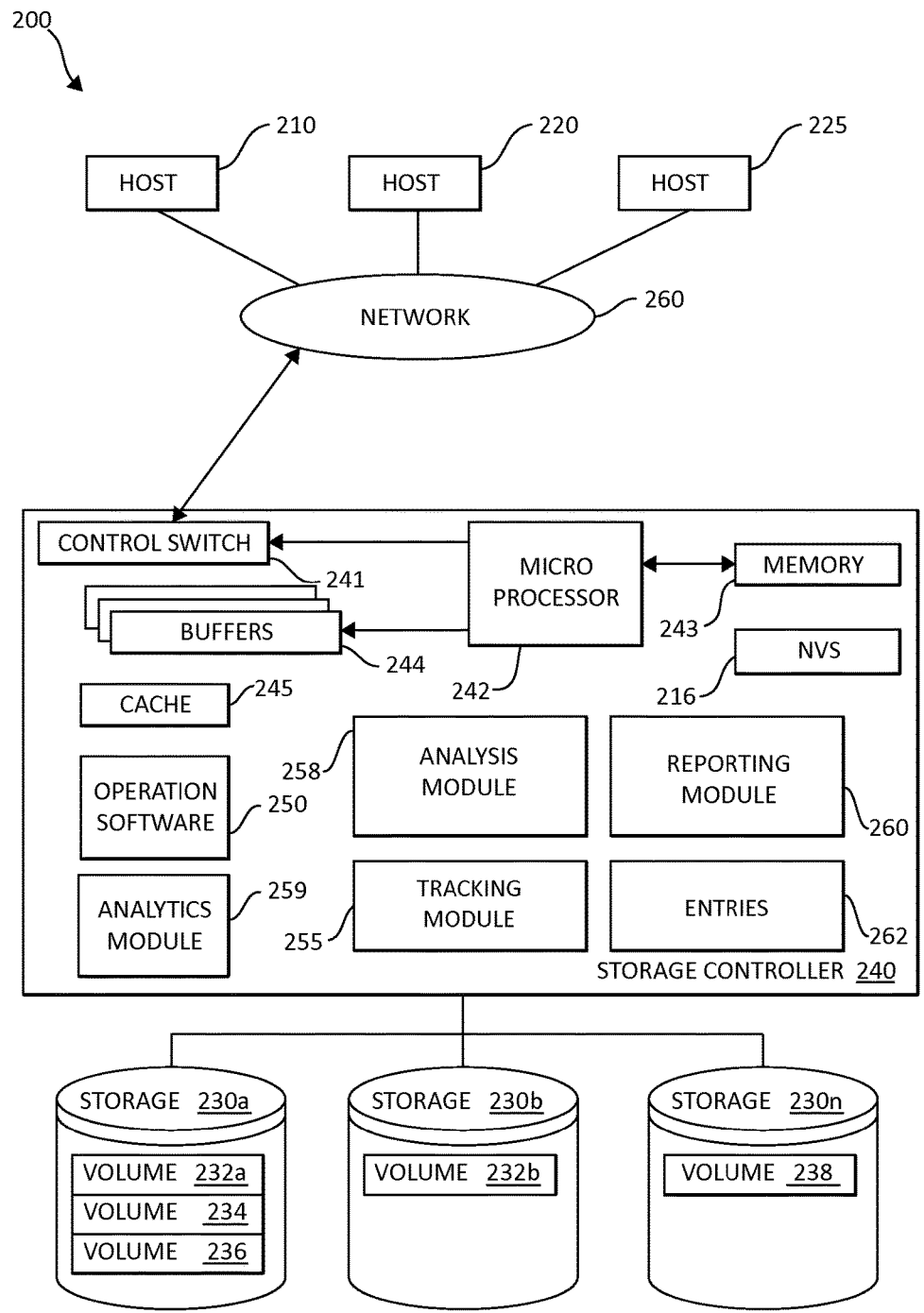
FIG. 2 is an exemplary block diagram showing a hardware structure of a data storage system in a computing storage environment, again in which aspects of the present invention may be realized.

FIG. 2 is an exemplary block diagram showing a hardware structure of a data storage system 200 that may be used in the overall context of performing functionality according to various aspects of the present invention. Data storage system may for example, in one embodiment, implement an enhanced multiple-tiered storage architecture as will be further described.

Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. Data storage system 200 may implement other functionality, such as that found in IBM® ProtecTIER® deduplication system TS7650G™, although one of ordinary skill in the art will recognize that a variety of deduplication, encryption, data processing, etc. hardware and software, separately or in combination, may be utilized to implement the functionality according to aspects of the illustrated embodiments.

Network connection 260 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes found in a distributed computing environment.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, an analysis module 258, a reporting module 260 and and one or more repositories (e.g., tables) for various entries 262. The tracking module 255, analysis module 258, reporting module 260 and entries 262 may operate in conjunction with each and every component of the storage controller 240, the hosts 210, 220, 225, and storage devices 230. The tracking module 255, analysis module 258, reporting module 260 and entries 262 may be structurally one complete module or may be associated and/or included with other individual modules. The tracking module 255, analysis module 258, reporting module 260 and entries 262 may also be located at least partially in the cache 245 or other components, as one of ordinary skill in the art will appreciate.

The tracking module 255, analysis module 258, reporting module 260 and entries 262 may individually and/or collectively perform various aspects of the present invention as will be further described. For example, the tracking module 255 may perform various tracking operations and related analytics in accordance with aspects of the illustrated embodiments. The analysis module 258 may also use analytics to identify, organize, create, delete or perform other actions on various patterns, trends, and other characteristics identified in the tracked data. Reporting module 260 may notify various portions of the data storage system 200 about changes in the physical placement of the data (e.g., the data being moved), warn users about placement of data in a particular location, and so forth. Finally, each of the various characteristics of the data segments (and information from operations related to the segments), including identification of the location of the data segments and other related attributes, may be stored, organized, retrieved, and deleted in the entries 262. As one of ordinary skill in the art will appreciate, the tracking module 255, analysis module 258, reporting module 260 and entries 262 may make up only a subset of various functional and/or functionally responsible entities in the data storage system 200.

Other ancillary hardware may be associated with the storage system 200. For example, as shown, the storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module, analysis module 258, reporting module 260, attribute repositories 262, or other blocks of functionality, in which information may be set. Multiple buffers 244 may be implemented with the present invention to assist with the operations as described herein.

Figure 3:
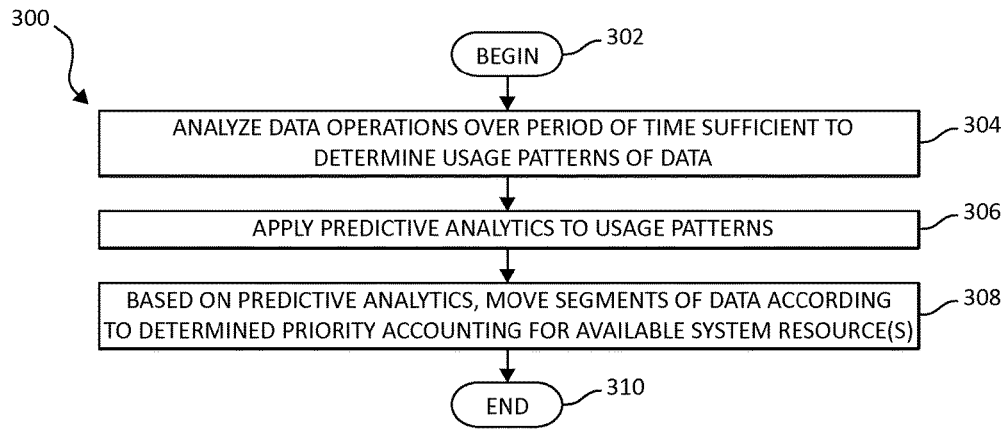
FIG. 3 is a flow chart diagram illustrating an exemplary method for data management across a multiple-tiered storage organization by a processor, in accordance with various aspects of the present invention.

Turning now to FIG. 3, a flow chart diagram, illustrating an exemplary method 300 for applying data analytics to data segments in a multiple-tiered storage organization according to the present invention, is depicted. Method 300 begins (step 302). As a first step, an analysis of the data operations themselves over a period of time is conducted, sufficient to determine various usage patterns of the data segments, for example (step 304).

The predictive analytics operations are performed to the identified data usage patterns in a subsequent step 306. Based on the predictive analytics operations, various identified segments are moved in the multiple-tiered storage organization, according to a determined priority that accounts for available system resources (among other factors, for example) (step 308). The method 300 then ends (step 310).

Figure 4:
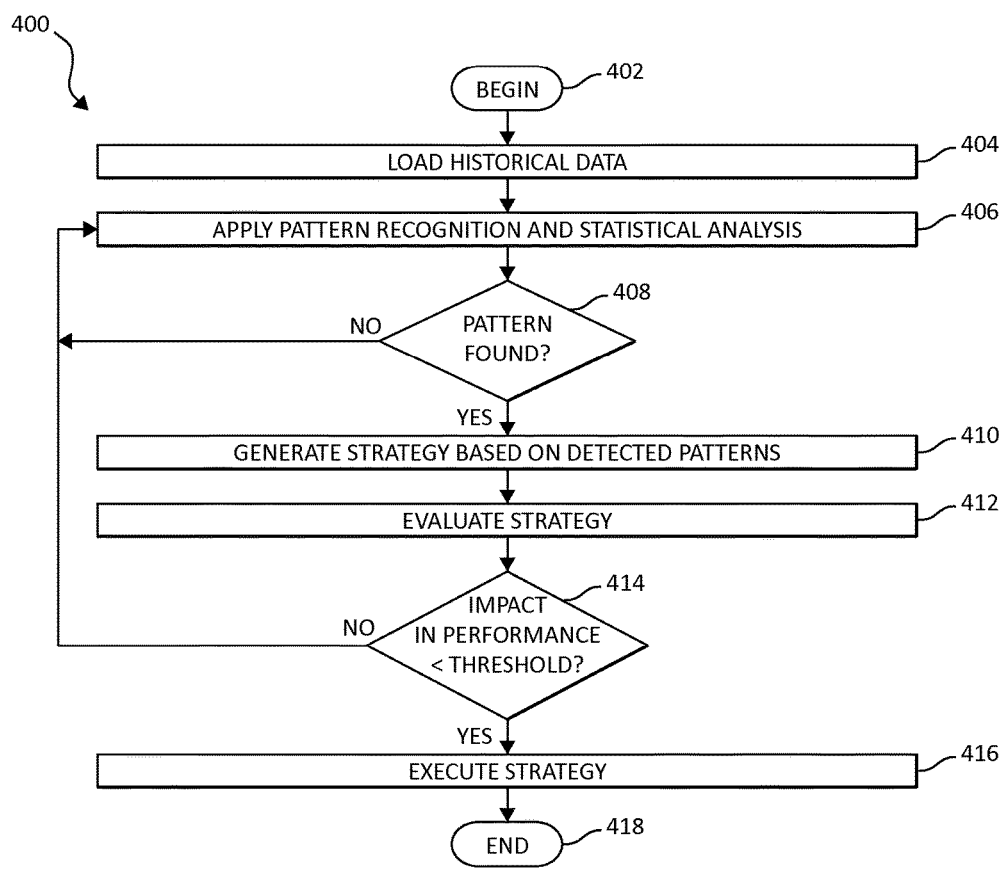
FIG. 4 is an additional flow chart diagram illustrating an additional exemplary method for data management across a multiple-tiered storage organization, again in which aspects of the present invention may be implemented.

Turning now to FIG. 4, an additional exemplary method for applying predictive analytics functionality to data segments in a multiple-tiered storage organization in order to improve performance, for example, is depicted as method 400.

Method 400 begins (step 402) the loading of historical data. The historical data may include the aforementioned reads (including associated information with the read operations), read and write throughput, disk thrashing information, various IOPS information, and the like.

In a subsequent step 406, pattern recognition and statistical analysis is applied to the historical data. In one embodiment, statistical analysis and pattern recognition may be applied by statistical packages. Patterns then emerge from the statistical analysis. The patterns may include additional information such as frequency, associations, clusters, and so forth.

If a pattern is found (decision step 408), the method 400 moves to step 410, which generates a strategy based on the detected patterns. A strategy may include data movement operations such as movement of the data to a higher (e.g., greater performance) tier, or movement of the data to a lower (e.g., lesser performance) tiers, and may include an associated time frame for performing the data movement operations.

In a subsequent step 412, the generated strategy is evaluated over time. A following decision step 414 queries whether the selected strategy resulted in an impact in performance less than a predetermined threshold. The impact on performance may be measured, for example, in estimated IOPS, data movement size, system idleness, and other related measurements. The threshold may be set by the user based on the user's specific requirements, constraints, and/or business needs, for example.

If the impact in performance is less than the predetermined threshold, the method 400 moves to step 416, where the strategy is executed. The method 400 then ends (step 418). Returning to decision step 414, if the impact in performance is not less than the predetermined threshold (e.g., exceeds the predetermined threshold), the method 400 returns to step 406 as previously depicted.

Figure 5A:
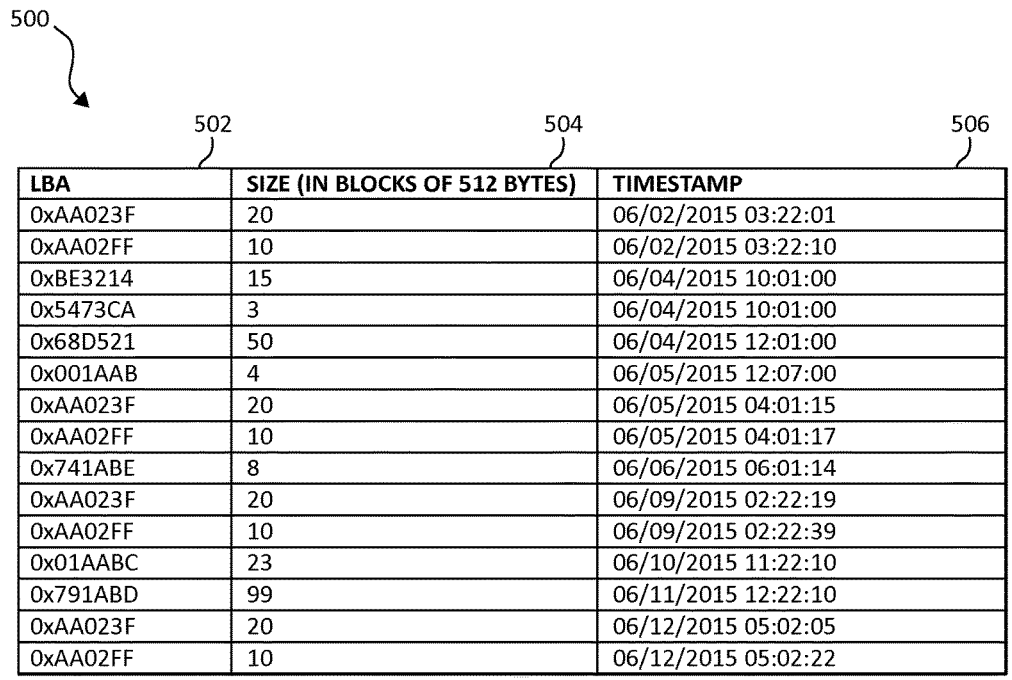
FIG. 5A is a first table illustrating exemplary analysis of read operations to identify read patterns and apply subsequent predictive analytics, according to various aspects of the present invention.
Figure 5B:
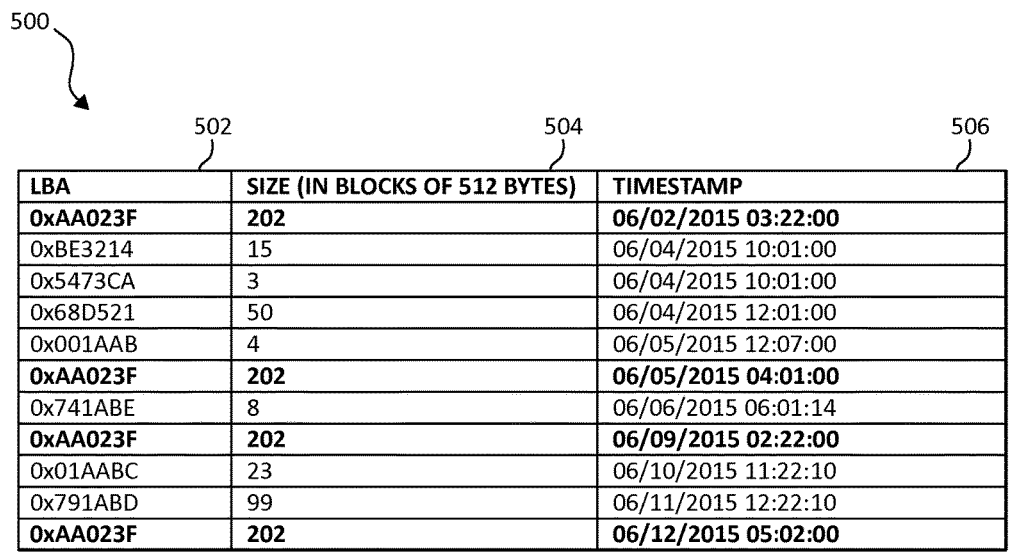
FIG. 5B is a second table illustrating further exemplary analysis of the read operations began in FIG. 5A, previously.
Figure 5C:
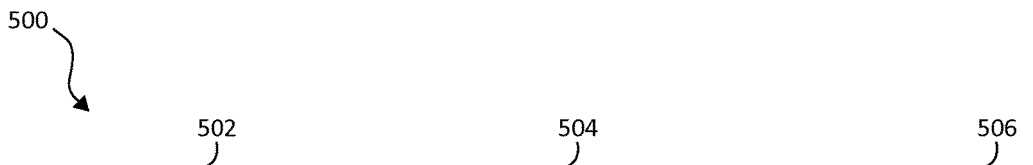
FIG. 5C is a third table illustrating further exemplary analysis of the read operations began in FIG. 5A and further illustrated in FIG. 5B, previously, again in which various aspects of the present invention may be implemented.

Turning now to FIGS. 5A-5C, a series of data tables 500 are shown in which various information gleaned from an exemplary storage organization is organized. As shown, a number of read operations over time (e.g., historical read information) is organized, first by LBA in column 502, the associated size of the read (in blocks of 512 bytes) in column 504, and the associated timestamp (e.g., date and time of the read operation) in column 506. FIG. 5A, then first shows the read data table 500 with relevant information organized and populated as shown.

The mechanisms of the illustrated embodiments utilize the information in read data table 500 to determine read patterns, as was previously described. Referring now to FIG. 5B, consider the following example of using the historical read information in tables 500 to attempt to create larger block access patterns, in order to reduce storage overhead and other storage resources needed for the tracking data set.

If, for example, multiple blocks in a particular range, (i.e., expanding upwards to 1 MB, 1OMB, or even substantial parts of a larger range such as 1 GB) are accessed during a certain period of time (i.e., 1 minute, 1 hour, 4 hours, 24 hours, etc.), the mechanisms of the present invention may apply data analytics to "reduce" the dataset. One objective of such dataset reduction operations is determine where applications, databases, and other interdependent data is located in the storage organization.

In the present example, it is possible to "reduce" the two reads 0xAA023F for 20 blocks, and 0xAA02FF for 10 blocks to 0xAA023F for 202 blocks. Since the read operations occur within a one-minute time period, the accompanying data resolution is decreased to minutes from seconds of resolution. Referring again to FIG. 5B, note that the various reads 0xAA02FF are now "reduced" and represented now in bold as 0xAA023F for 202 blocks.

Referring now to FIG. 5C, a pattern recognition algorithm or other functionality may be applied to the historical data to identify data patterns. As shown, a pattern emerges that the identified 202 blocks starting at 0xAA023F are being requested every Tuesday and Friday afternoon. The mechanisms of the illustrated embodiments, according to an implemented strategy, may then proactively move LBA 0xAA023F for 202 blocks (or event 0xAA0000 for 1024 blocks) to either a read cache, or to a faster tier of the storage organization, with the objective of the data being in position in the moved location before 2:00 PM. Further analysis also shows that this data has never been requested after 6:00 PM on either Tuesday or Friday, and thus, a range for eviction of the data from the cache, or demotion from the higher performance tier to a slower tier of storage may be set for after 6:00 PM.

The data collection shown in table 500 may continue over time, and the larger the data set (through, for example, intelligent grouping of reads), the more read patterns and data trends that the statistical analysis may uncover. One of ordinary skill in the art will appreciate that the depicted embodiment represents a highly compressed, example of the mechanisms of the illustrated embodiments, and that the collection of additional historical data over a longer period of time will enable the determination of additional data patterns and trends pursuant to various aspects of the illustrated embodiments. In addition, the functionality depicted in FIGS. 5A-5C is representative of one aspect of the historical data (e.g., data reads), and a wide variety of other historical data attributes may be collected, and predictive analytics applied, as previously indicated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for data management across a multiple-tiered storage organization by a processor, comprising:
   analyzing data operations performed across the multiple-tiered storage organization over a period of time sufficient to determine usage patterns of the data by analyzing data read operations from hosts to predict read patterns of the data, the usage patterns inclusive of at least a time of day and the day of a week the data operations are performed;
   applying predictive analytics to the usage patterns using idle resources of the multiple-tiered storage organization, the predictive analytics implemented as a background task operation performed by the idle resources such that the data operations are analyzed and the usage patterns of the data are determined in the background task operation performed by the idle resources; and
   based on the predictive analytics, moving segments of the data between the multiple-tiered storage organization according to a determined priority accounting for available system resources; wherein the segments of data are moved according to a predetermined priority corresponding to the predicted read patterns from the hosts, including using the time of day and the day of the week the data operations are performed to predict which of the segments of data will be accessed at a future time during the time of day and the day of the week the data operations were previously performed such that the segments of data are moved to facilitate the data operations from the hosts at the future time during the time of day and day of the week the data operations are predicted to be performed, to optimize storage characteristics of the data in the multiple-tiered storage organization.

2. The method of claim 1, further including configuring the predetermined priority according to a size of the read patterns.

3. The method of claim 1, further including:
   storing at least one of an original storage performance identifier, an original Logical Block Address (LBA) range, and a new location for moved segments of the data, and
   examining at least one of the original storage performance identifier, original LBA range, and new location when determining whether the moved segments of the data should be further moved within the multiple-tiered storage organization so as to reduce unnecessary data caching or tiering operations.

4. The method of claim 1, further including tracking at least one of a read throughput and a write throughput within the multiple-tiered storage organization as a portion of the predictive analytics operations.

5. The method of claim 1, further including tracking at least one of a read Input/Output Operation per Second (IOPS) and a write IOPS in the multiple-tiered storage organization as a portion of the predictive analytics operations.

6. The method of claim 1, further including moving the segments of the data according to a user-configurable threshold in at least one of a pre-defined time window and predefined performance window.

7. A system for data management across a multiple-tiered storage organization, comprising:
   a processor, operable in the multiple-tiered storage organization, wherein the processor:
      analyzes data operations performed across the multiple-tiered storage organization over a period of time sufficient to determine usage patterns of the data by analyzing data read operations from hosts to predict read patterns of the data, the usage patterns inclusive of at least a time of day and the day of a week the data operations are performed;
      applies predictive analytics to the usage patterns using idle resources of the multiple-tiered storage organization, the predictive analytics implemented as a background task operation performed by the idle resources such that the data operations are analyzed and the usage patterns of the data are determined in the background task operation performed by the idle resources; and
      based on the predictive analytics, moves segments of the data between the multiple-tiered storage organization according to a determined priority accounting for available system resources; wherein the segments of data are moved according to a predetermined priority corresponding to the predicted read patterns from the hosts, including using the time of day and the day of the week the data operations are performed to predict which of the segments of data will be accessed at a future time during the time of day and the day of the week the data operations were previously performed such that the segments of data are moved to facilitate the data operations from the hosts at the future time during the time of day and day of the week the data operations are predicted to be performed, to optimize storage characteristics of the data in the multiple-tiered storage organization.

8. The system of claim 7, wherein the processor configures the predetermined priority according to a size of the read patterns.

9. The system of claim 7, wherein the processor:
   stores at least one of an original storage performance identifier, an original Logical Block Address (LBA) range, and a new location for moved segments of the data, and
   examines at least one of the original storage performance identifier, original LBA range, and new location when determining whether the moved segments of the data should be further moved within the multiple-tiered storage organization so as to reduce unnecessary data caching or tiering operations.

10. The system of claim 7, wherein the processor tracks at least one of a read throughput and a write throughput within the multiple-tiered storage organization as a portion of the predictive analytics operations.

11. The system of claim 7, wherein the processor tracks at least one of a read Input/Output Operation per Second (IOPS) and a write IOPS in the multiple-tiered storage organization as a portion of the predictive analytics operations.

12. The system of claim 7, wherein the processor moves the segments of the data according to a user-configurable threshold in at least one of a pre-defined time window and predefined performance window.

13. A computer program product for data management across a multiple-tiered storage organization by a processor, the computer program product comprising a non-transitory computer-readable storage medium having computer-readable program code portions stored therein, the computer-readable program code portions comprising:
   an executable portion that analyzes data operations performed across the multiple-tiered storage organization over a period of time sufficient to determine usage patterns of the data by analyzing data read operations from hosts to predict read patterns of the data, the usage patterns inclusive of at least a time of day and the day of a week the data operations are performed;
   an executable portion that applies predictive analytics to the usage patterns using idle resources of the multiple-tiered storage organization, the predictive analytics implemented as a background task operation performed by the idle resources such that the data operations are analyzed and the usage patterns of the data are determined in the background task operation performed by the idle resources; and
   an executable portion that, based on the predictive analytics, moves segments of the data between the multiple-tiered storage organization according to a determined priority accounting for available system resources; wherein the segments of data are moved according to a predetermined priority corresponding to the predicted read patterns from the hosts, including using the time of day and the day of the week the data operations are performed to predict which of the segments of data will be accessed at a future time during the time of day and the day of the week the data operations were previously performed such that the segments of data are moved to facilitate the data operations from the hosts at the future time during the time of day and day of the week the data operations are predicted to be performed, to optimize storage characteristics of the data in the multiple-tiered storage organization.

14. The computer program product of claim 13, further including an executable portion that configures the predetermined priority according to a size of the read patterns.

15. The computer program product of claim 13, further including an executable portion that:
   stores at least one of an original storage performance identifier, an original Logical Block Address (LBA) range, and a new location for moved segments of the data, and
   examines at least one of the original storage performance identifier, original LBA range, and new location when determining whether the moved segments of the data should be further moved within the multiple-tiered storage organization so as to reduce unnecessary data caching or tiering operations.

16. The computer program product of claim 13, further including an executable portion that tracks at least one of a read throughput and a write throughput within the multiple-tiered storage organization as a portion of the predictive analytics operations.

17. The computer program product of claim 13, further including an executable portion that tracks at least one of a read Input/Output Operation per Second (IOPS) and a write IOPS in the multiple-tiered storage organization as a portion of the predictive analytics operations.

18. The computer program product of claim 13, further including an executable portion that moves the segments of the data according to a user-configurable threshold in at least one of a pre-defined time window and predefined performance window.

* * * * *